United States Patent [19]
Ohmura

[11] Patent Number: 5,101,922
[45] Date of Patent: Apr. 7, 1992

[54] REAR WHEEL STEERING SYSTEM WITH FAIL-SAFE SYSTEM

[75] Inventor: Hiroshi Ohmura, Hakkaichi, Japan

[73] Assignee: Mazda Motor Corporation, Hiroshima, Japan

[21] Appl. No.: 616,946

[22] Filed: Nov. 21, 1990

[30] Foreign Application Priority Data

Nov. 22, 1989 [JP] Japan ................. 1-303702

[51] Int. Cl.⁵ ............................ B62D 7/15
[52] U.S. Cl. ................. 180/79.1; 180/140; 364/424/05
[58] Field of Search ............ 180/140, 79.1; 280/91; 364/424.05

[56] References Cited

U.S. PATENT DOCUMENTS

| | | | |
|---|---|---|---|
| 4,782,907 | 11/1988 | Morishita et al. | 180/140 |
| 4,860,842 | 8/1989 | Yamashita et al. | 280/91 X |
| 4,893,688 | 1/1990 | Morishita | 180/140 X |
| 4,953,648 | 9/1990 | Ohmura | 180/140 X |
| 4,953,652 | 9/1990 | Ohumra et al. | 180/140 |
| 4,976,328 | 12/1990 | Ohmura | 180/140 |

FOREIGN PATENT DOCUMENTS

| | | | |
|---|---|---|---|
| 229771 | 9/1989 | Japan | 280/91 |
| 262265 | 10/1989 | Japan | 280/91 |
| 114063 | 4/1990 | Japan | 280/91 |

Primary Examiner—Charles A. Marmor
Assistant Examiner—Kevin Hurley
Attorney, Agent, or Firm—Fleit, Jacobson, Cohn, Price, Holman & Stern

[57] ABSTRACT

A rear wheel steering system of a four wheel steering vehicle comprising a rear wheel steering mechanism for steering a rear wheel, an urging device for urging a rear wheel toward a neutral position of the rear wheel, a motor connected with the rear wheel steering mechanism for providing the rear wheel with steering force against resilient force of the urging device, a clutch for transmitting a driving force of the motor to the rear wheel steering mechanism, steering position detector for detecting a steered position of the rear wheels, control unit for receiving a signal from the steering position detector and for forming a motor control signal by which the motor is controlled to steer the rear wheel. The steering position detector has at least three detectors for detecting a steered position of the rear wheel. A returning device is provided in the control unit for returning the rear wheel to the neutral position by means of the motor when an abnormal condition is detected in the detectors but at least two of the detectors have the same indication of the steered position of the rear wheel, and for disengaging the clutch to return the rear wheel to the neutral position by virtue of the resilient force of the urging device. The rear wheel is returned to the neutral position without making the steering of the vehicle unstable when the rear wheel steering system is an abnormal condition.

8 Claims, 4 Drawing Sheets

REAR WHEEL STEERING SYSTEM WITH FAIL-SAFE SYSTEM

BACKGROUND OF THE INVENTION

1. Field of the Invention

This invention relates to a four wheel steering system, more specifically to a rear wheel steering system of the four wheel steering system of a vehicle.

2. Description of the Related Art

It has been known a four wheel steering system of a vehicle in which a rear wheel is steered in accordance with a steering of a front wheel. In the four wheel steering system, it has been also known by for example, Japanese Patent Public Disclosure No. 57-44568, laid open to the public in 1982 that the steering of the rear wheel is made by an electric motor. According to the rear wheel steering system utilizing the motor disclosed in the Japanese Patent application, there is provided a return spring for returning the rear wheel from a position where stopped to a neutral position in an abnormal condition of the rear wheel steering system. The motor is connected with the rear wheel steering system through a clutch. When the abnormality occurs in the rear steering system, the clutch is disengaged so that the return spring returns the rear wheel to the neutral position.

It should however be noted that a resilient force of the return spring is not controllable. Therefore, When the rear wheel is returned to the neutral position, the steering condition of the vehicle may change undesirably abruptly so that vehicle operation is made unstable.

SUMMARY OF THE INVENTION

It is therefore an object of the invention to provide a safe rear wheel steering system of a four wheel steering vehicle.

It is another object of the invention to provide a rear wheel steering system in which a rear wheel is returned to the neutral position without making the steering of the vehicle unstable when the rear wheel steering system is an abnormal condition.

It is still another object of the present invention to prevent an abrupt return of the rear wheel to the neutral position under an abnormal condition of the rear wheel steering system.

The above and other objects of the invention can be accomplished by a rear wheel steering system of a four wheel steering vehicle comprising a rear wheel steering mechanism for steering a rear wheel, urging means for urging a rear wheel toward a neutral position of the rear wheel, a motor connected with the rear wheel steering mechanism for providing the rear wheel with steering force against resilient force of the urging means, a clutch for transmitting a driving force of the motor to the rear wheel steering mechanism, steering position detecting means for detecting a steered position of the rear wheel, control means for receiving a signal from the steering position detecting means and for forming a motor control signal by which the motor is controlled to steer the rear wheel, the steering position detecting means having at least three detectors for detecting a steered position of the rear wheel, returning means provided in the control means for returning the rear wheel to the neutral position by means of the motor when an abnormal condition is detected in the detectors but at least two of the detectors have the same indication of the steered position of the rear wheel, and for disengaging the clutch to return the rear wheel to the neutral position by virtue of the resilient force of the urging means when all the detectors have different indications of the steered position of the rear wheel.

In a preferred embodiment, when an abnormality is detected in the motor, the returning means disengages the clutch to return the rear wheel to the neutral position by means of the resilient force of the urging means. Whereas, the returning means drives the motor to return the rear wheel to the neutral position when an abnormality is detected in the detectors but at least two of the detectors have the same indication of the steered position in this embodiment.

In another preferred embodiment, the control means includes at least two microprocessors therein, one of which is provided for controlling the steering angle of the rear wheel, and the other of which is provided for watch operation of the one of the microprocessors. When an abnormality is detected in the one of the microprocessors for controlling the rear wheel steering, the returning means disengages the clutch to return the rear wheel to the neutral position by virtue of the resilient force of the urging means.

In another aspect of the invention, the control means judges whether the rear wheel is in a same phase steering position in which the rear wheel is steered in the same direction as a front wheel or the rear wheel is in an opposite phase in which the rear wheel is steered in an opposite direction to the front wheel. The control means is provided with speed change means for changing return speed of the rear wheel to the neutral position when the abnormality is detected in the rear wheel steering mechanism. The speed change means returns the rear wheel to the neutral position with a relatively low return speed when the rear wheel is in the same phase position at the time of the detection of the abnormality of the rear wheel steering mechanism. On the other hand, when the rear wheel is in the opposite phase position at the time of the detection of the abnormality of the rear wheel steering mechanism, the speed change means returns the the rear wheel to the neutral position with a relatively high speed.

The detectors for detecting the rear wheel steered position have tendency to fall into an abnormal condition among components of the rear wheel steering mechanism. In order to detect the steered position of the rear wheel properly, it would be proposed to provide a pair of detectors. It should however be noted that it is difficult to determine which of the detectors is properly operated. Thus, in such rear wheel steering system, it is necessary to return the rear wheel to the neutral position as quickly as possible so as to achieve a proper steering control. For this purpose, the clutch has to be disengaged to return the rear wheel to the neutral position by virtue of the urging means quickly whenever one of the detectors is fallen into the abnormal condition.

In view of this, according to the present invention, at least three detectors are equipped for detecting the steered position of the rear wheel. Should one of the three detectors be in an abnormal condition, rest of the detectors operate normally and thus must have the same indication so that it is possible to return the rear wheel to the neutral position by means Of the motor based on the proper steered position of the rear wheel obtained through the two detectors other than the abnormal detector. In this case, since it is not necessary to return the rear wheel to the neutral position abruptly, the rear wheel is returned to the neutral position by driving the motor.

When the rear wheel is steered in the opposite phase position in the case where an abnormality has been detected in the rear wheel steering system, a yawing of the vehicle may be caused so that the rear wheel is returned more quickly than when the rear wheel is in the opposite phase.

The above and other objects and features of the present invention will be apparent from the following description taking reference with accompanying drawings.

DESCRIPTION OF THE PREFERRED EMBODIMENT

Figure 1:
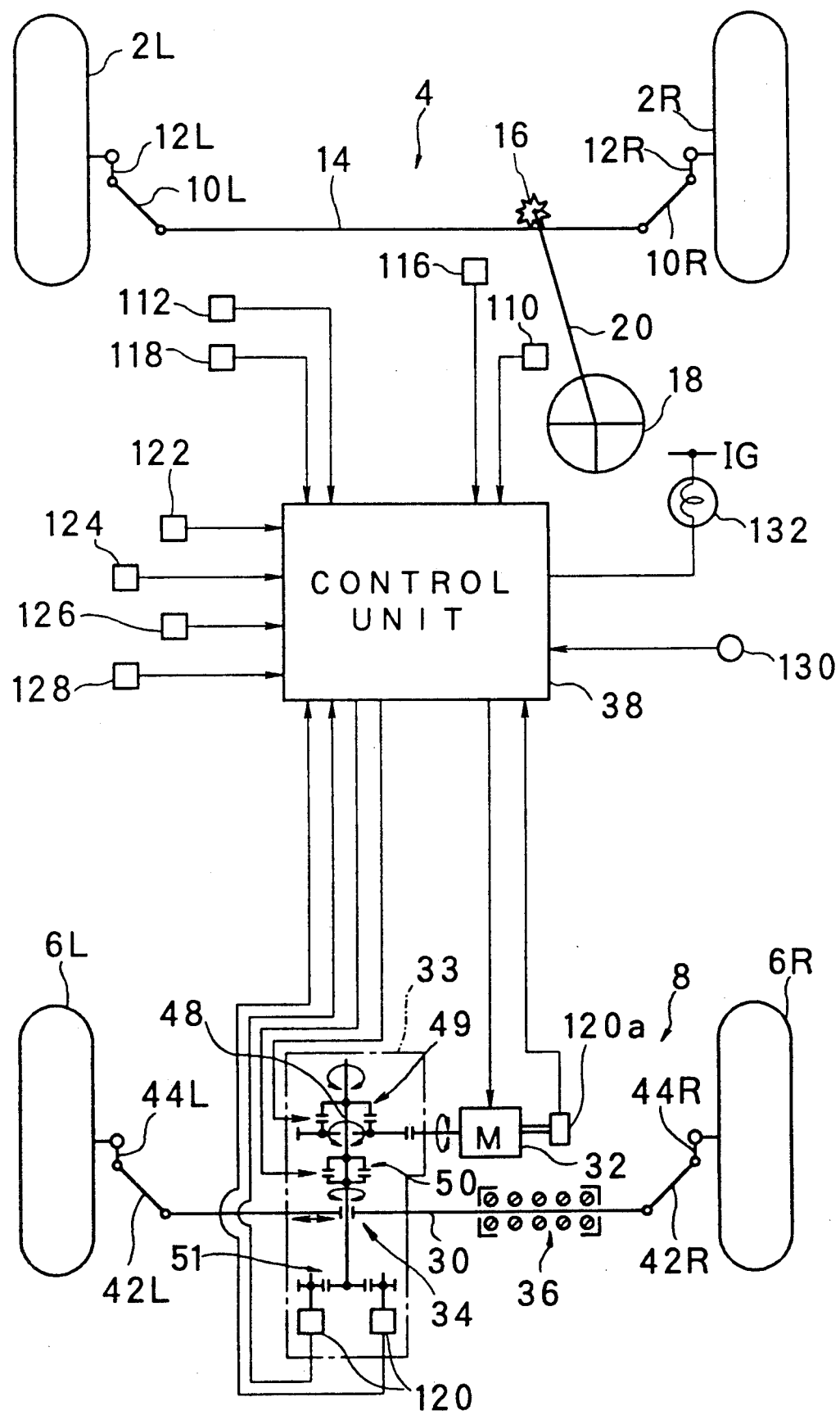
FIG. 1 shows a schematic view of a vehicle steering system provided with a rear wheel steering system according to the present invention.

FIG. 1 shows a schematic view of a vehicle steering system provided with a rear wheel steering-system according to the present invention.

Referring to FIG. 1, an illustrated vehicle is provided with a front wheel steering system 4 for steering a right and left front wheels 2R, 2L and a rear wheel steering system 8 for steering a right and left rear wheels 6R, 6L. The front wheel steering system 4 is provided with a front axle 14 which is extended transversely and is connected with the front wheels 2R and 2L at opposite ends through a pair of right and left tie rods 10R, 10L and knuckle arms 12R, 12L. A steering shaft 20 is provided with a steering wheel 18 at one end and with a pinion 16 at the other end. The pinion 16 is meshed with a rack (not shown) formed on the front axle 14 so that the steering wheel 18 is operated to cause a lateral movement of the front axle 14 to thereby steer the front wheels 2R and 2L.

The rear wheel steering system 8 is provided with a rear steering axle 30 in which a centering spring 36 as a urging means for urging the steering axle 30 at a neutral position is provided. The rear wheel steering system 8 is provided with a servo motor which steers the rear wheels 6R and 6L against resilient force of the spring 36. A driving force from the servo motor 32 is transmitted to the rear axle 30 through a transmitting mechanism 33.

The rear wheel steering system 8 is extended transversely and connected with the rear wheels 6R and 6L through a pair of tie rods 42R and 42L and knuckle arms 44R and 44L so that a lateral or transverse movement of the rear axle 30 steers the rear wheels 6R and 6L.

The transmitting mechanism 33 is provided with an intermediate shaft 48 which is connected with an output shaft of the servo motor 32 through a first clutch mechanism 49. The intermediate shaft 48 is provided with a second clutch mechanism. The intermediate shaft 48 is connected with the rear axle 30 through a pinion rack mechanism 34. A control unit 38 is equipped for controlling the first and second clutch mechanisms 49 and 50, when the rear wheels 6R and 6L are not steered, the control unit 38 produces signals for disengaging the first and second clutches 49 and 50.

When the clutches 49 and 50 are disengaged, the rear axle 30 and thus the rear wheels 6R and 6L is returned to the neutral position where the rear wheel is not steered to provide steering angle with zero. On the other hand, when the rear wheels 6R and 6L are steered, the control unit 38 produces signals to engage the clutches 49 and 50. The control unit 38 produces signals for driving the servo motor 32 in response to the steering of the front wheels 2R and 2L. when the servo motor 32 is driven, the rear axle 30 is moved in the lateral direction against the resilient force of the spring 36 so that the rear wheels 6R and 6L connected with the rear axle 30 are steered to achieve a target value.

Output of the second clutch 50 is transmitted to a pair of steering angle sensors 120 through a gear mechanism 51. The signals denoting the steering angle of the rear wheels 6R and 6L are introduced into the control unit 38. There is provided with a rotary encoder 120a for detecting a rotational position of the servo motor 32. Signal from the rotary encoder 120a is also introduced into the control unit 38.

Figure 4:
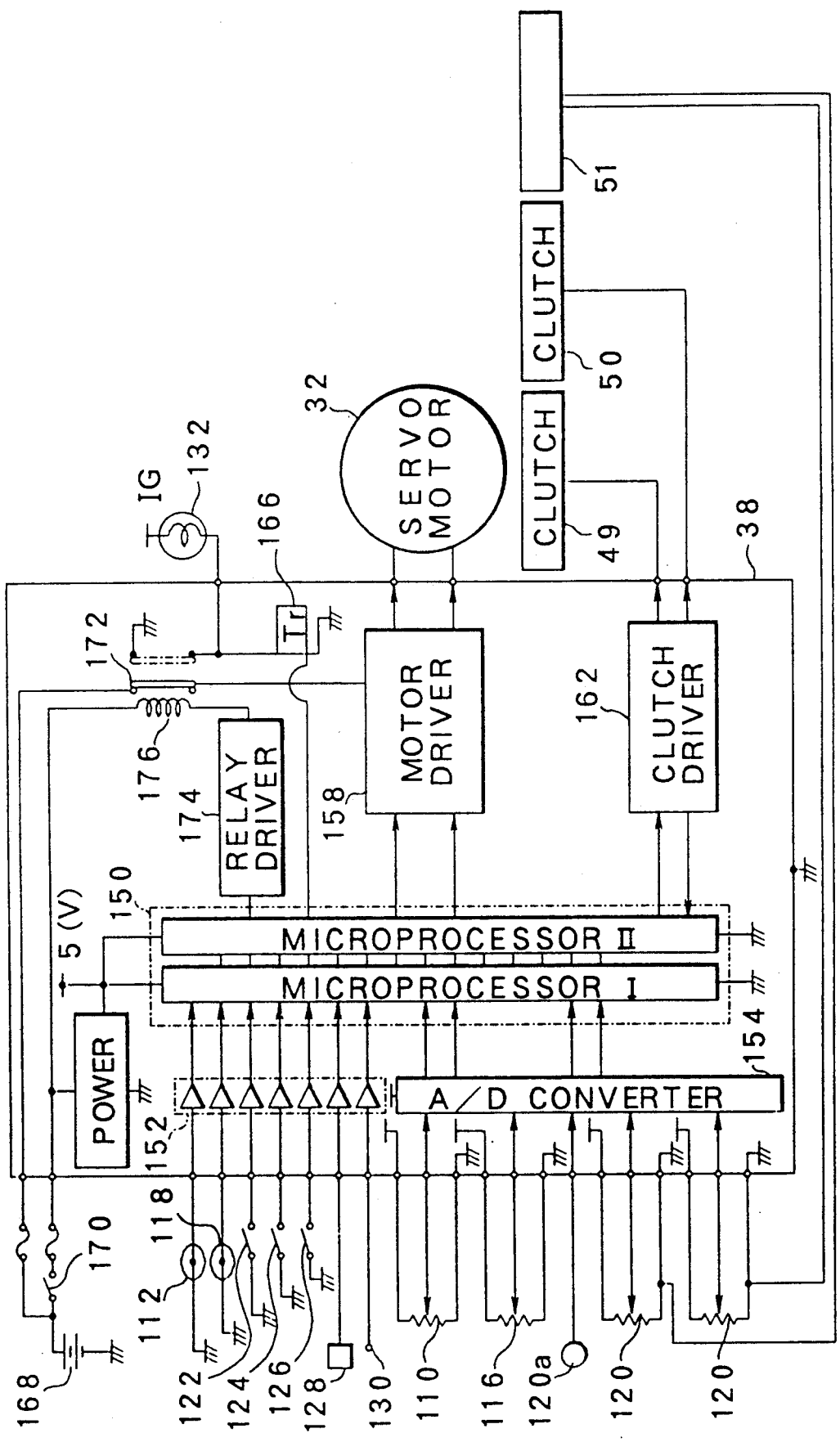
FIG. 4 is a block chart of a control unit for steering rear wheels.

The control unit 38 receives other signals from a steering wheel angle sensor 110 for detecting steering angle of the steering wheel 18, a front wheel angle sensor 116 for detecting steering angle of the front wheels 2R and 2L as shown in FIG. 4. A pair of vehicle speed sensors 112 and 118 are provided for detecting a vehicle speed. There are further provided a neutral clutch switch 122 for detecting the neutral position of a transmission, an inhibitor switch 124, a brake switch 126, an engine switch 128. Signals from such switches are also introduced into the control unit 38. Signal from L-terminal of the alternator 130 is introduced into the control unit 38. A warning lamp 132 is connected with the control unit 38.

Figure 2:
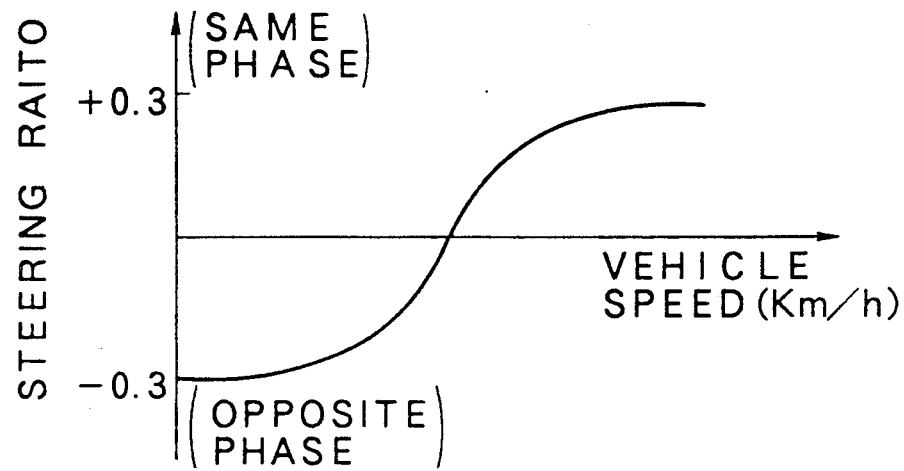
FIG. 2 is a graphical representation showing a relationship between a vehicle speed and steering ratio.
Figure 3:
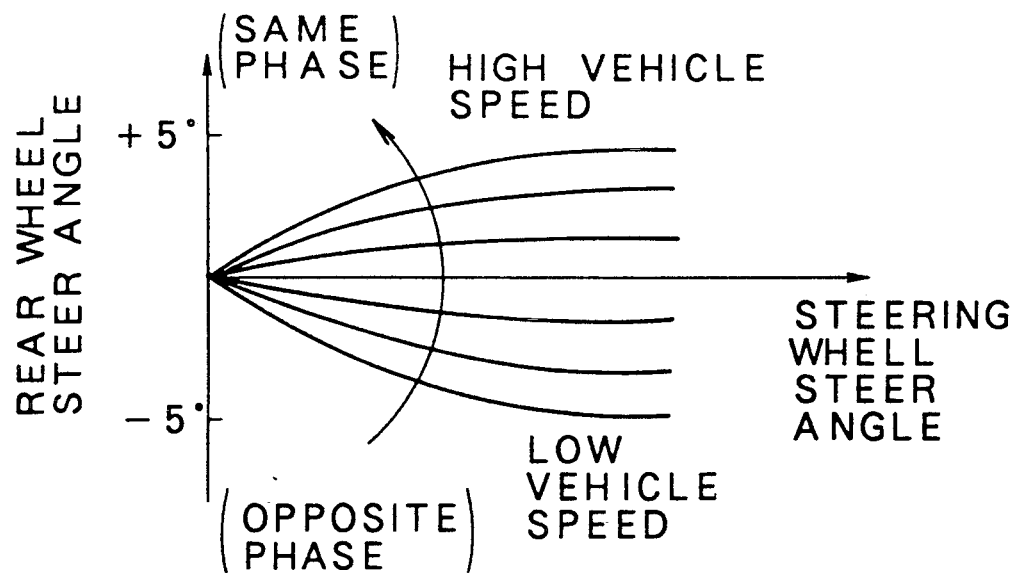
FIG. 3 is a graphical representation showing a relationship between steering angle of steering wheel and rear wheel steering angle.

In the illustrated embodiment, the rear wheel steering control is made in response to the vehicle speed. A steering ratio of the rear wheel to the front wheel is determined based on the vehicle speed. The steering ratio changes as the vehicle speed changes as shown in FIG. 2. As the vehicle speed is increased, a rear wheel steering angle property is moved toward the same phase position as that of the front wheels 2R and 2L as shown in FIG. 3. As shown in FIG. 4, The control unit 38 is provided with a processing unit 150 having microprocessors I and II. The processing unit 150 receives signals from the vehicle speed sensors 112 and 118, switches 122, 124, 126 and 128, and L terminal of the alternator 130 through a buffer 152. The processing unit 150 also receives signals from the wheel steering angle sensor 110, the front wheel steering angle sensor 116, the rear wheel steering angle sensor 120 and the rotary encoder 120a through an A/D converter 154. A signal is formed in the processing unit 150 is supplied to the servo motor 32 through a motor drive circuit 158 and to the first and second clutches 49 and 50 through a clutch drive circuit 162. The rear wheel steering control is initiated when the signal from the L terminal of the alternator 130 is changed to a high level. The warning lamp 132 is turned on when a transistor 166 receives a current at its base from the processing unit 150. Numerals 168, 170 and 172 designate a battery, ignition key switch of engine, and a relay. When an abnormality occurs, a relay drive circuit is actuated to stop the current supply to a coil 176 so that the relay 172 is switched to stop the current supply to the motor drive circuit 158 to turn the warning lamp 132 on bypassing the transistor 166.

According to the illustrated embodiment, the microprocessor, I is employed for controlling the steering system and the other is used for watching whether or not any abnormal condition occurs in the microprocessor I. The other microprocessor II detects an abnormality of the rear wheel steering system. The abnormalities in the rear wheel steering system includes abnormalities in the microprocessor I, the motor 32, the rear wheel steering angle sensor 120, the rotary encoder 120a, the vehicle speed sensors 112 and 118 and a voltage drop of power source. The microprocessor II watches whether or not the above abnormalities occur in the rear wheel steering system and produces a signal informing an abormal condition when it occurs.

Figure 5:
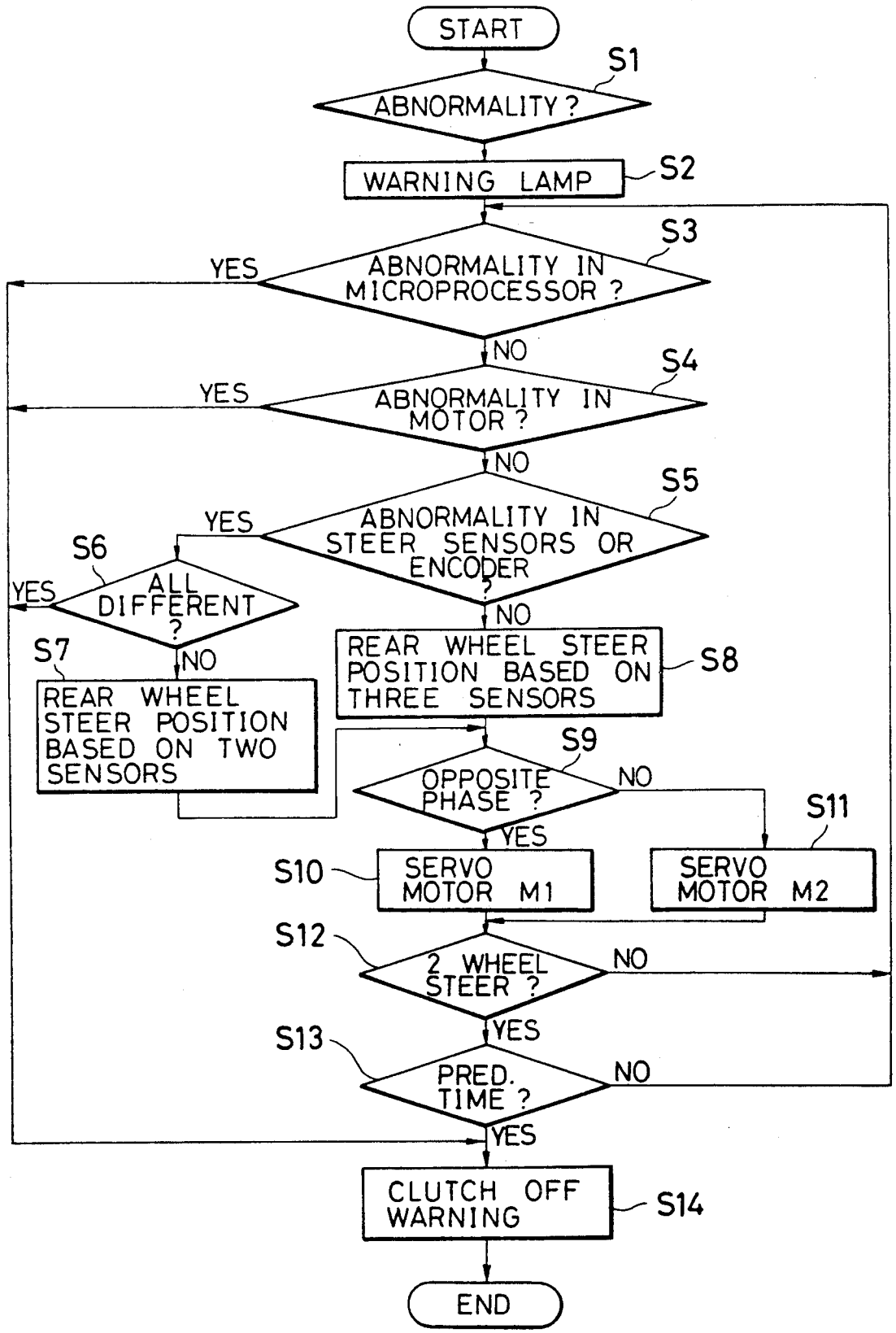
FIG. 5 is a flow chart of a rear steering control in the case of abnormality of the rear wheel steering system.

Referring to FIG. 5, there is shown a flow chart of a control where an abnormality is detected.

In FIG. 5, the control unit 38 judges whether or not an abnormality is detected (step S1).

If the judgment is yes, or if the abnormality is detected in the steering system, the control unit 38 causes the warning lamp 132 to be turned on (step S2).

Next, the control unit 38 judges whether or not the microprocessor I and the motor 32 are in abnormal condition respectively ( step S3 and S4). When the microprocessor I or the motor 32 is judged as in abnormal condition, the clutches 49 and 50 are disengaged so that the rear wheels 6R and 6L are returned to the neutral position by virtue of the resilient force of tho spring 36. In the steps S3 and S4, where it is judged that the micro processor I and motor 32 are in normal condition, the control unit 38 judges whether or not the steering sensors 120 and the rotary encoder 120a are in abnormal condition (step S5). The control unit 38 hold that all of them are in normal condition when they indicate the same steering angle of the rear wheels 6R and 6L. When it is judged that abnormality occurs in the steering sensors 120 or the rotary encoder 120a, the control unit 38 judges whether or not the the sensors 120 and the rotary encoder 120a have outputs corresponding to different rear wheel steering angles respectively (step S6). If the judgment is Yes, the control unit 38 disengages the clutches 49 and 50 so as to return the rear wheels 6R and 6L to the neutral position by means of the spring 36. When the judgment in step S6 is no, or when two of the sensors 120 and the encoder 120a denote the same rear wheel steering angle, the control unit 38 recognizes the steered position of the rear wheels 6R and 6L .based on the indications of the two of the sensors 120 and the encoder 120a (step S7). If all the sensors 120 and the encoder 120a are in normal condition, the control unit 38 recognizes the steered position of the rear wheels 6R and 6L based on the three of the sensors 120 and the encoder 120a (step S8).

Next, the control unit 38 judges whether or not the steered position of the rear wheels 6R and 6L is in an opposite phase position in which the rear wheels 6R and 6L are steered in an opposite direction to that of the front wheels 2R and 2L. If the judgment is Yes, in other words, if the rear wheels 6R and 6L are in the opposite phase position, the control unit 38 returns the rear wheels 6R and 6L to the neutral position by driving the servo motor 32 with a relatively high speed M1 to establish a two wheel steering condition in which only the front wheels 2R and 2L are steered. If the judgment is No, or the rear wheels 6R and 6L are in a same phase position in which the rear wheels 6R and 6L are steered in the same direction as the front wheels 2R and 2L, the control unit 38 returns the rear wheels 6R and 6L to the neutral position by driving the servo motor 32 with a relatively low speed M2 (M1 > M2) to establish the two wheel steering condition.

When the two wheel steering condition is established within predetermined time period, the control unit 38 repeats the procedures from the steps S3 to S11. This enable the control unit 38 to disengage the clutches 49 and 50 to thereby returning the rear wheels 6R and 6L promptly to the neutral position by means of the spring 36 when the microprocessor I or the motor 32 is fallen into an abnormal condition. On the other hand, when the two wheel steering condition is not established with the predetermined time period, the control unit 38 disengages the clutches 49 and 50 and produces warning for driver to reduce the vehicle speed (step S13 and S14). The warning can be made by means of a buzzer, a warning lamp or the like.

It should be noted that although the present invention is described in connection with a specific embodiment taking reference with the accompanying drawings, many modifications can be made by those skilled in the art based on the foregoing and all of the modifications fall within the scope of the present invention defined by the attached claims

What is claimed is:

1. A rear wheel steering system of a four wheel steering vehicle comprising
   a rear wheel steering mechanism for steering at least one rear wheel,
   urging means for urging the rear wheel toward a neutral position of the rear wheel,
   a motor connected with the rear wheel steering mechanism for providing the rear wheel with steering force against resilient force of the urging means,
   a clutch for transmitting a driving force of the motor to the rear wheel steering mechanism,
   steering position detecting means for detecting a steered position of the rear wheel,
   control means for receiving a signal from the steering position detecting means and for forming a motor control signal by which the motor is controlled to steer the rear wheel,
   the steering position detecting means having at least three detectors for detecting a steered position of the rear wheel,
   returning means provided in the control means for returning the rear wheel to the neutral position by means of the motor when an abnormal condition is detected in the detectors but at least two of the detectors have the same indication of the steered position of the rear wheel, and for disengaging the clutch to return the rear wheel to the neutral position by virtue of the resilient force of the urging means when all the detectors have different indications of the steered position of the rear wheel.

2. A rear wheel steering system as recited in claim 1 wherein the returning means disengages the clutch to return the rear wheel to the neutral position by means of the resilient force of the urging means when an abnormality is detected in the motor.

3. A rear wheel steering system as recited in claim 1 wherein the control means includes a pair of microprocessors therein, one of the microprocessors being provided for controlling the steering angle of the rear wheel, the other of the microprocessors being provided for watching operation of the one of the microprocessors, the returning means disengaging the clutch to return the rear wheel to the neutral position by virtue of the resilient force of the urging means when an abnormality is detected in the microprocessor.

4. A rear wheel steering system as recited in claim 1 wherein the control means judges whether the rear wheel is in a same phase steering position in which the rear wheel is steered in the same direction as a front wheel, the control means being provided with speed change means for changing return speed of the rear wheel to the neutral position when the abnormality is detected in the rear wheel steering mechanism, the speed change means returning the rear wheel to the neutral position with a relatively low return speed when the rear wheel is in the same phase position at the time of the detection of the abnormality of the rear wheel steering mechanism.

5. A rear wheel steering system as recited in claim 4 wherein when the rear wheel is in an opposite phase position in which the rear wheel is steered in a direction opposite to that of the front wheel at the time of the detection of the abnormality of the rear wheel steering mechanism, the speed change means return the the rear wheel to the neutral position with a relatively high speed.

6. A rear wheel steering system as recited in claim 1 wherein two of the detectors are constituted by a pair of rear wheel steering sensors for detecting a steered angle of the rear wheel, and the rest of the detectors is constituted by a rotary encoder for detecting a rotational position of the motor.

7. A rear wheel steering system as recited in claim 1 wherein the control means controls the motor so that the rear wheel is steered to the neutral position when the abnormality is detected in one of the detectors to establish a two wheel steering condition in which only front wheel is steered.

8. A rear wheel steering system as recited in claim 7 wherein the control means disengages the clutch to return the rear wheel to the neutral position by virtue of the resilient force of the spring when the two wheel steering condition is not established within a predetermined time period after the abnormality is detected in the one of the detectors.

* * * * *